United States Patent [19]
Loftfield et al.

[11] 3,893,902
[45] July 8, 1975

[54] ELECTROLYTIC SEA WATER PROCESS

[75] Inventors: Richard E. Loftfield, Chardon; John E. Bennett; John E. Cinke, both of Painesville, all of Ohio

[73] Assignee: Diamond Shamrock Corporation, Cleveland, Ohio

[22] Filed: Apr. 12, 1973

[21] Appl. No.: 350,598

[52] U.S. Cl. ............................... 204/95; 204/275
[51] Int. Cl. .......................................... B01k 1/00
[58] Field of Search ...................... 204/94, 95, 275

[56] References Cited
UNITED STATES PATENTS

| | | | |
|---|---|---|---|
| 2,959,532 | 11/1960 | Hendee et al. | 204/275 |
| 3,282,823 | 11/1966 | Richards | 204/95 |
| 3,558,466 | 1/1971 | Lebrizzi et al. | 204/275 |
| 3,682,809 | 8/1972 | Marquardson et al. | 204/275 |
| 3,718,540 | 2/1973 | Bailey | 204/275 |
| 3,766,045 | 10/1973 | Itakura et al. | 204/275 |

Primary Examiner—Oscar R. Vertiz
Assistant Examiner—Wayne A. Langel
Attorney, Agent, or Firm—Timothy E. Tinkler

[57] ABSTRACT

A cell and a method of operation are disclosed whereby sea water may be electrolyzed to form an aqueous hypochlorite solution with reduced formation of interfering deposits on the electrodes. The cell design and method of operation ensure suspension of particulate matter in the electrolyte and also allow intermittent backwashing to remove any accumulations of contaminants.

4 Claims, 3 Drawing Figures

3,893,902

ELECTROLYTIC SEA WATER PROCESS

BACKGROUND OF THE INVENTION

The advantages of an ability to electrolyze readily available sea water to obtain chlorine in a form useful, e.g., for disinfection of municipal waste water effluents and treatment of industrial cooling waters, are obvious. Unfortunately, however, the methods of accomplishing this result are not as obvious. Experience has shown that the variety of contaminants present in sea water result in the formation of deposits on internal cell surfaces, especially on cathodic surfaces, which deposits interfere with, and eventually prevent, further electrolysis. This explains a number of recent developments designed to remove the deposits before they become a serious detriment to further operation. Exemplary of these proposals are the use of intermittent air blasts to dislodge particles and the use of a periodic acid wash to dissolve deposits. Since they depend primarily upon removal of the deposits, rather than prevention of their formation, such proposals have not proven entirely satisfactory or economical.

STATEMENT OF THE INVENTION

Therefore, it is an object of the present invention to provide a method for the electrolysis of sea water.

It is a further object of the present invention to provide a method for the electrolysis of sea water without substantial formation of interfering deposits upon the electrode surfaces.

It is a still further object of the present invention to provide a cell for the efficient and substantially continuous electrolysis of sea water.

These and further objects of the present invention will become apparent to those skilled in the art from the specification and claims that follow.

There has now been found, a method for reducing the formation of undesirable deposits on the electrodes of a cell for the electrolysis of sea water to produce hypochlorite, said cell comprising an enclosure containing a plurality of vertically disposed electrodes in an alternating array of anodes and cathodes, which method comprises:

A. introducing sea water to the cell at a point below the electrodes through a series of orifices substantially corresponding in number and location to at least the cathodes, the direction of the orifices being such that the sea water first impinges primarily on nonelectrode surfaces immediately subjacent the electrodes, the sea water velocity through the orifices being between 5 and 25 feet per second;
B. maintaining a sea water velocity through the cell during electrolysis sufficient to at least suspend substantially all particulate matter present;
C. intermittently halting electrolysis and flushing the cell with sea water introduced through a like series of orifices at a point above, and directed substantially onto, the electrodes;
D. removing a slurry of particulate material from the bottom of the cell; and
E. resuming electrolysis.

The process is preferably conducted in a cell that comprises:

A. an enclosure comprising vertical end walls and vertical side walls defining an essentially rectangular electrolysis zone, a bottom compartment narrowing to a means for removing liquid and entrained solids from the cell bottom, a top compartment narrowing to a means for removing liquid and gas from the cell top, each compartment being in open communication with said electrolysis zone;
B. an alternate array of vertically disposed anodes and cathodes substantially transversing the width of said electrolysis zone, the first and last of said electrodes being anodes and each anode extending above and below the adjacent cathode, each anode being in electrical contact on one end thereof with a vertical electrical distributor means adjacent one side wall, each cathode likewise being in contact on one end thereof with a vertical electrical collector means adjacent the opposite side wall, opposite ends of the electrodes butting in an electrically insulating electrolyte resistant material, which material serves to space apart adjacent electrodes and to isolate the vertical distributor and collector means from the electrolyte;
C. a plurality of electrolyte inlet pipes within and traversing the length of the bottom compartment at a point below the electrodes, said pipes having therein a series of orifices corresponding and in like number to at least the cathodes, said orifices being disposed so that liquid exiting the pipes therethrough impinges primarily on nonelectrode surfaces; and
D. two backwash pipes located in a like manner in the top compartment, the orifices therein being disposed so that liquid impinges primarily on and between the electrodes.

The method of the present invention, through the combined effect of the swirling motion imparted to the electrolyte by means of flow through the orifices and the lifting motion of the flow through the cell, serves to keep particulate matter in motion and hence to discourage any substantial deposition or buildup of same. Thus, the particles are kept in suspension and at least partially carried from the cell with the hypochlorite-containing effluent. Since recirculation of the inexpensive sea water, while contemplated, is not required, buildup of contaminants is reduced.

The particular cell described is designed so that substantially no "dead areas" exist in the vicinity of the electrodes. The provisions that both terminal electrodes be anodes and that each anode have a greater (vertical) surface area than the adjacent cathode, further operate to reduce deposit formation. Further, the narrowing of the top compartment to the outlet means prevents particle "fall out" that would normally occur through velocity decrease without this constriction while the narrowing of the bottom compartment to the outlet means maintains electrolyte velocity and ensures that particles may be easily flushed from the cell.

DESCRIPTION OF THE PREFERRED EMBODIMENTS

Figure 1:
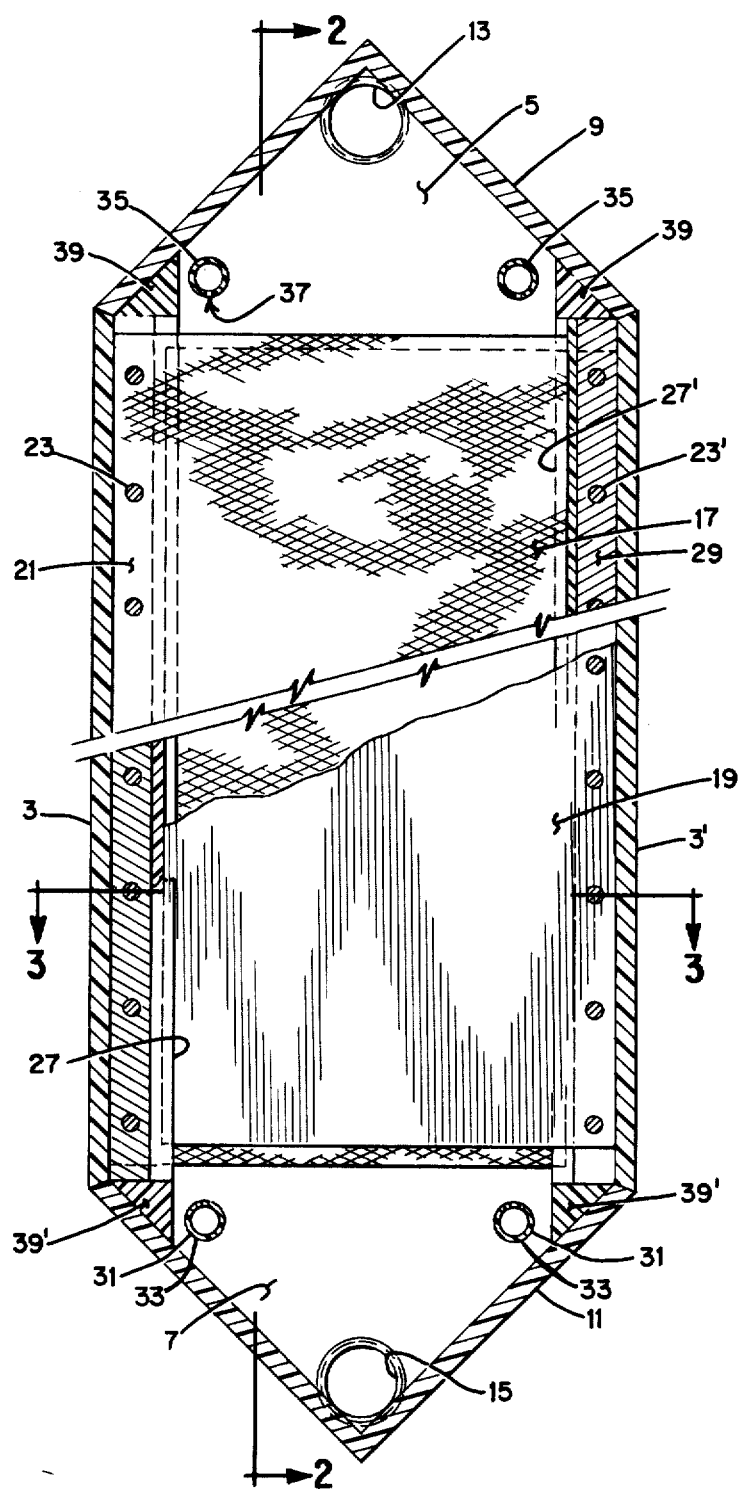
FIG. 1 is a section across the width of a cell with an anode partially cut away for clarity.

Essentially, the present invention provides a means to convert sea water into a solution having microbiocidal properties. This is accomplished by the relatively low current density electrolysis of sea water, without chemical pretreatment thereof, into a hypochlorite solution having a concentration on the general order of about 1 gram per liter, which solution may then be mixed directly with the material to be treated, generally the effluent water from a municipal waste treatment plant or an industrial cooling stream.

The desired reactions, both electrochemical and chemical, take place within the cell, which may be generally described as an enclosure containing alternate anodes and cathodes. Without the provisions of the present invention, substantial deposits of an often indeterminate nature but usually attributed to the presence of hardness ions in the sea water, will form on interior cell surfaces, particularly on the cathodes. It has been noted that "growth" of these deposits takes place from seed particles that lodge in areas of low electrolyte circulation. The present invention, with its combination of directed injection of sea water into the cell, high velocity flow rate through the cell and intermittent backwashing, substantially prevents such deposits from forming and/or interfering with the electrolytic process.

In operation, introduction of the sea water through the orifices at a rate of between 5 and 25 feet per second, combined with direction of the flow onto nonelectrode surfaces below and usually immediately subjacent the electrodes, serves to create a swirling and cleaning effect particularly on the bottom corners of the electrodes where deposits tend to establish initially. By direction onto nonelectrode surfaces, abrasion of the electrodes is reduced. Since the swirling action extends into the interelectrode gap only a very short distance, the electrolytic process, e.g., gas release, is not interfered with. Obviously, the location of an orifice adjacent each electrode, or at least each cathode, ensures uniformity of electrolyte circulation. The second operational feature of maintaining a sufficient velocity of sea water flow through the cell, generally on the order of 2.0 to 2.5, but within the range of 1.5 to 24, (vertical inches per second, has the purpose of at least suspending any particulate matter in the electrolyte and preferably sweeping a good deal of such material from the cell with the hypochlorite-containing effluent. Of course, as particles grow during suspension in the interelectrode area, their weight may become such as to cause them to fall to the bottom of the cell for later removal. It has been noted that the desired effect of maintaining a substantially deposit-free electrode is peculiar to the combination of flow rate and high velocity, directed, injection. That is, the same effect cannot be obtained by merely increasing either injection velocity or flow rate alone.

Since small amounts of deposits will often form on the top edges of the electrodes, especially adjacent the side walls where it is difficult to adequately direct electrolyte flow, it is desirable to intermittently, for example, daily, interrupt electrolysis and backwash the cell. To effect this backwashing, introduction of sea water through the inlet orifices is ceased or subtantially reduced and sea water is introduced through the backwash orifices above the electrodes at a rate sufficient to dislodge any adhering deposits. The direction of the backwash orifices is obviously onto and between the electrodes, especially in the areas adjacent the side walls. These materials, plus any large particles which have fallen to the bottom compartment, are removed through the bottom outlet means. Thereafter, flushing is ceased, sea water injection is resumed, and electrolysis proceeds.

While a number of cells may be modified to practice the operation of the present invention, said operation is optimized by use of a preferred cell which includes terminal anodes, anodes with vertical dimensions greater than their opposed cathodes, inlet and backwash pipes with orifices directed in the prescribed manner and top and bottom compartments narrowing to outlet means. The manner of combining these components into the cell of the present invention will become apparent by reference to the drawings.

Figure 2:
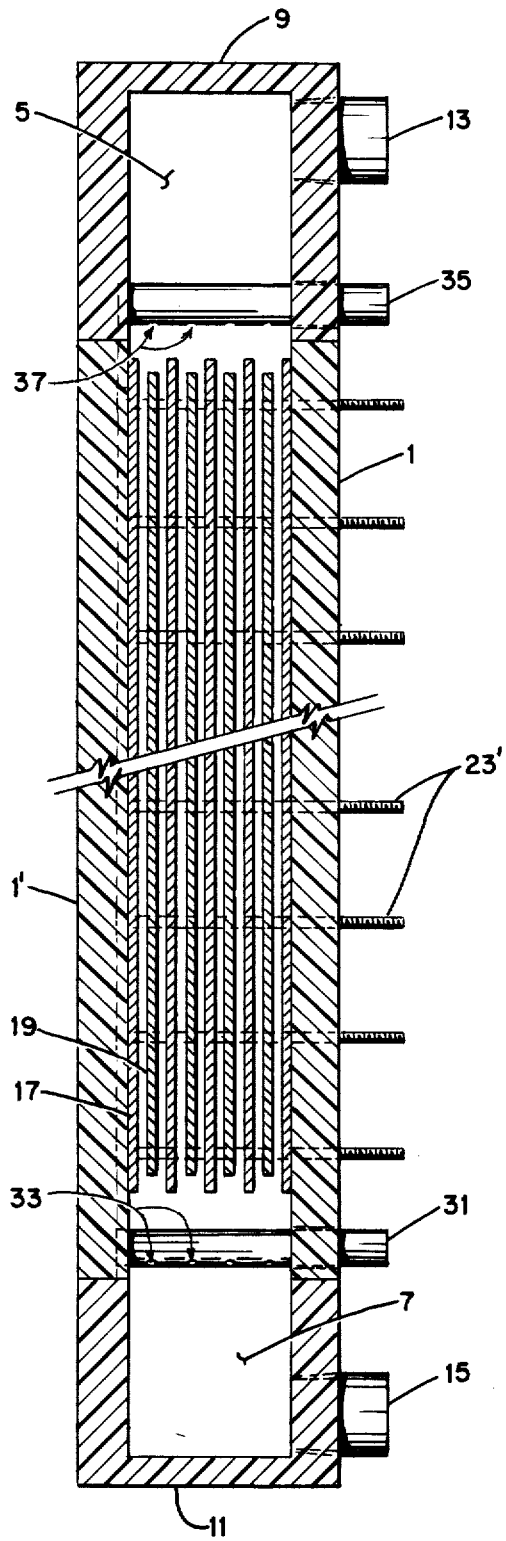
FIG. 2 is a sectional side view along the length of the cell on the line 2—2 of FIG. 1.
Figure 3:
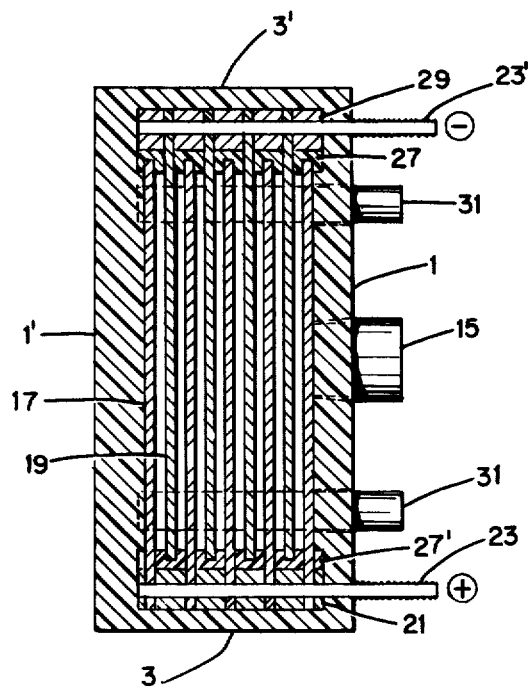
FIG. 3 is a sectional top view of the same cell along the line 3—3 of FIG. 1.

Referring now to FIGS. 1–3, a typical cell of the present invention comprises an enclosure having vertical end walls 1 and 1' and vertical side walls 3 and 3' that together define an essentially rectangular electrolysis zone. The enclosure is completed by top compartment 5 and bottom compartment 7 defined by, respectively, cover 9 and bottom 11. The enclosure may be constructed of any material suitably resistant (chemically and mechanically) to the electrolyte, the products of electrolysis and the operating conditions, for example, polyvinyl chloride, chlorinated polyvinyl chloride, and polymeric methacrylate esters. As can be seen in FIG. 1, both the top and bottom compartments narrow to outlet means, the outlet 13 in the top compartment 5 being for the spent electrolyte containing the desired hypochlorite and any entrained solids as well as gaseous products of the reaction while the bottom outlet 15 is employed primarily to remove liquid and entrained solids during the backwashing operation. The narrowing of the bottom compartment 7 to the outlet means 15 is both to facilitate removal of solids from the cell during backwashing and maintain electrolyte velocity. In the top compartment 5, the narrowing or restriction serves the purpose of maintaining the velocity of flow through the cell and hence entrainment of any suspended solids outside the electrolysis zone. Although the compartments are shown in FIG. 1 to be essentially triangular in design, they may also be, for example, in the shape of a half circle or beveled on one side, so long as the appropriate narrowing effect is obtained. Finally, it will be noted that the top and bottom compartments are in open communication with the electrolysis zone defined by walls 1, 1', 3 and 3'.

Within the electrolysis zone is an alternate array of vertically, or substantially vertically, disposed anodes 17 and cathodes 19, each of which substantially traverses the width of the electrolysis zone and whose number is dictated by production requirements and other practical considerations. As is best shown in FIG. 2, each of the anodes extends in a vertical direction above and below the adjacent cathode 19. The length of this projection is generally on the order of from 0.125 to 0.5 inch. The apparent effect of this extension is to chemically modify to a slight extent the nature of the electrolyte, e.g., by lowering its pH, thus assisting in maintaining the cathodes in a deposit-free condition. It has also been found desirable to bevel or round the tops and bottoms of the cathodes, again to discourage deposit adhesion. A further feature of the cell is the use of two terminal anodes 17, contrary to the standard practice in a bipolar cell of employing a terminal anode and a terminal cathode. Since it has been found that deposits in cells for the electrolysis of sea water are more of a problem on the cathodes than on the anodes and further that these deposits being their growth in areas remote from vigorous electrolyte flow, it has been extremely important to carefully seal all cathode areas abutting nonelectrode surfaces. This was particularly difficult to accomplish in the case of a terminal cathode. For this reason, and that mentioned earlier of altering the pH characteristics of the electrolyte, a pair of terminal anodes is employed.

As is best seen in FIG. 3, the anodes 17 are in electrical contact on one end thereof with a vertical electrical distributing means. This means serves to bring current from a source external the cell to the anodes themselves and may comprise a series of vertical metal conductor strips 21 which embrace either side of an anode 17 adjacent the side wall 3. These vertical strips and the anode ends may be held in tight electrical contact with a plurality of threaded metal studs 23 that extend through the anodes 17, strips 21 and one end wall 1. With the use, for example, of a combination of nuts and welds (not shown), the assembly may be drawn and held together. External bus bars (not shown) may then be attached to the ends of the studs 23 external the cell. Opposite ends of the anodes 17 are shown to terminate in gasket caps 27 which are composed of an insulating material, such as rubber, and serve to electrically insulate and physically space the anodes from contact with cathodic surfaces. As a preferred alternative to the use of gasketing material, such as the gasket caps, the ends of the electrodes may be potted, or cast, into a plastic material, such as an epoxy, which may then be cured in situ to provide a completely leak proof sealing and spacing function.

It will then be seen that the cathodes 19 are assembled in a like manner with the ends adjacent one cell wall 3' being in contact with electrical collecting means serving to transmit current from the cathodes to a point external the cell. The means may comprise a series of vertical collector strips 29 and studs 23' again held together and in place with suitable means. Opposite ends are also cast in gasket material 27'.

As is best seen in FIG. 1, longitudinal wedges 39 and 39' are located, respectively, in top compartment 5 and bottom compartment 7, which wedges, made of insulating material such as rubber, serve to close the corner areas between the electrolysis zone and the cell top 9 and bottom 11, thus removing a "dead space" for possible deposit accumulation.

Within the bottom compartment 7 are located a plurality, two shown, of electrolyte inlet pipes 31, traversing the length of the bottom compartment 7 at a point usually just below the electrodes. Within these pipes are a series of orifices 33, best shown in FIG. 2, disposed in such a manner that the sea water exiting therefrom into the cell impinges primarily on nonelectrode surfaces, i.e., the cell bottom 11, usually immediately subjacent the electrodes 17 and 19. While the orifices are usually merely holes, other configurations may be dictated by circumstance. For example, slot-like openings may be used to increase electrolyte flow. These pipes are again constructed of any suitably inert material, conveniently plastic. Of course, external the cell, and not shown, is a source of sea water and generally a pump to impart the required velocity to the sea water injected into the cell.

Above the electrolysis zone in compartment 5 are located a plurality of backwash pipes 35. Again a series of orifices 37 are found in each backwash pipe, in this instance directed in such a manner that the backwash liquid (sea water) impinges on and between the electrodes, especially in the areas adjacent the side walls where any deposits tend to accumulate.

The number and location of both orifices 33 and 37 are generally such that they correspond to the electrodes. However, since deposit accumulation is particularly prevalent on cathodic surfaces, it is possible to limit their number and location so that they substantially correspond to the cathodes present.

While their identity is not critical to the practice of the present invention, except in that they be suitable for the process contemplated, the electrodes are generally composed as follows. The anodes, while they may be graphite blades, are preferably dimensionally stable anodes, e.g., a titanium or other valve metal substrate bearing on the surface thereof an electrically conductive and electrocatalytic coating, such as a platinum group metal, platinum group metal oxide, or any of the various mixed coatings known to the art. Cathodes may conveniently be constructed of steel, stainless steel, nickel, or, preferably, titanium. The cathodes will generally be employed as an imperforate sheet while the anodes may be either an imperforate sheet or a foraminous material, e.g., expanded metal mesh.

It is advisable, in order that adequate circulation and suspension of entrained materials may be had and to prevent minor deposits from interfering with the process, that the interelectrode gap be somewhat greater than that advocated for cells designed primarily for use at high current densities, a gap on the order of from 0.10–0.20 inch being suitable.

A cell as illustrated in the attached drawings but employing two nickel sheet cathodes and three titanium mesh anodes, the latter bearing a mixed crystal coating of ruthenium and titanium dioxides on the surface thereof, at an interelectrode gap of 0.16 inch, is operated at 0.75 ampere per square inch anode current density to prepare an approximately 1 gram per liter hypochlorite solution from sea water containing about 30 grams per liter NaCl. The operating temperature of the cell is about 17° C with a sea water velocity through the inlet orifices of about 18 feet per second and a rate of flow through the cell on the order of 6 gallons per minute (2.05 vertical inches per second). Operation continues for about 23.5 hours, at which time electrolysis is halted and the cell is backwashed with sea water for 20 minutes prior to resumption of electrolysis. In this manner, the cell has been operated for periods of time in excess of 3 months without substantial interference from either anodic or cathodic deposits.

We claim:

1. In the method of operating a cell for the electrolysis of sea water to produce hypochlorite, which cell comprises an enclosure containing a plurality of vertically disposed electrodes in an alternate array of anodes and cathodes, the improvement which comprises reducing the formation of undesirable deposits on the electrodes by:

A. introducing sea water to the cell at a point below the electrodes through a series of orifices, substantially corresponding in number and location to at least the cathodes, the direction of the orifices being such that the sea water first impinges primarily on nonelectrode surfaces immediately subjacent the electrodes, and the sea water velocity through the orifices being between 5 and 25 feet per second; and B. maintaining a sea water velocity through the cell during electrolysis sufficient to at least suspend substantially all particulate matter present.

2. A method as in claim 1 wherein the sea water velocity through the cell in Step (B) is within the range of 1.5 to 24 inches per second.

3. In the method of operating a cell for the electrolysis of sea water to produce hypochlorite, which cell comprises an enclosure containing a plurality of vertically disposed electrodes in an alternate array of anodes and cathodes, the improvement which comprises reducing the formation of undesirable deposits on the electrodes by:

A. introducing sea water to the cell at a point below the electrodes through a series of orifices, substantially corresponding in number and location to at least the cathodes, the direction of the orifices being such that the sea water first impinges primarily on nonelectrode surfaces immediately subjacent the electrodes, and the sea water velocity through the orifices being between 5 and 25 feet per second;

B. maintaining a sea water velocity through the cell during electrolysis sufficient to at least suspend substantially all particulate matter present;

C. intermittently halting electrolysis and flushing the cell with sea water introduced through a like series of orifices at a point above the electrodes;

D. removing a slurry of particulate material from the bottom of the cell; and

E. resuming electrolysis.

4. A method as in claim 3 wherein the direction of the orifices in Step (C) is such that the sea water is directed onto and between the electrodes.

* * * * *